United States Patent Office 3,732,169
Patented May 8, 1973

3,732,169
POLY(ALKOXY)SILOXANE FLUID COMPOSITION CONTAINING A PHENOLIC CRYSTALLIZATION INHIBITOR
Merwyn L. Burrous, El Cerrito, and Neal W. Furby, Berkeley, Calif., assignors to Chevron Research Company, San Francisco, Calif.
No Drawing. Continuation-in-part of abandoned application Ser. No. 860,051, Sept. 22, 1969. This application Jan. 31, 1972, Ser. No. 222,344
Int. Cl. C09k 3/00
U.S. Cl. 252—78
9 Claims

ABSTRACT OF THE DISCLOSURE

A functional fluid inhibited against crystallization which comprises a poly(alkoxy)siloxane base fluid, a bulk oxidation inhibitor, and a phenolic crystallization in-inhibitor. A rubber swelling agent may also be present.

CROSS REFERENCE TO RELATED APPLICATION

This application is a continuation-in-part of application Ser. No. 860,051, filed Sept. 22, 1969 and now abandoned.

BACKGROUND OF THE INVENTION

Field of the invention

This invention relates to a novel organosilicon fluid composition. More particularly, the invention is concerned with a poly(alkoxy)siloxane composition that is exceptionally resistant to crystallization caused by thin-film oxidation at high temperatures and is, therefore, useful as a durable high-temperature hydraulic power transmission fluid.

Hydraulic systems containing poly(alkoxy)siloxane fluids as the power transmission medium are well known in the art. These fluids are often used in aircraft hydraulic systems, in which they serve to operate such components of the aircraft as the landing gear and the control surfaces on the wings and tail assembly. These siloxane fluids have been found useful in such applications because of their advantageous combination of such properties as density, viscosity index, and lubricity.

Experience with these fluids has shown that they suffer from a serious bulk oxidation problem. This problem has been kept within reasonable limitations by the common practice of including small amounts of a bulk oxidation inhibitor in commercial siloxane fluids.

It has also been found that in the hydraulic systems of high speed aircraft, a second type of oxidation of the fluid is encountered. This is referred to as "thin film oxidation," and is manifested by the formation of crystals on portions of the hydraulic apparatus where the fluid is drawn out into a thin film and heated by the frictional resistance of the passing air. Such crystallization may occur, for instance, on the hydraulic jacks which operate the wing control surfaces. The crystals prevent smooth operation of the jacks and can seriously affect control of the aircraft. It has been found that the conventional bulk oxidation inhibitors are not capable of controlling this crystallization.

Description of the prior art

Poly(alkoxy)siloxane hydraulic fluids are widely described in the prior art. A typical description is found in U.S. Pat. 3,146,206, issued to N. W. Furby et al. Hindered phenolic compounds are described in U.S. Pats. 3,226,443 and 3,247,240.

SUMMARY

The composition of this invention is a fluid composition suitable for use as the power transmission medium in a hydraulic system and exhibiting good oxidative stability at temperatures in the range of 300°–400° F., and comprising 55 to 99.8 weight percent poly(alkoxy)siloxane, the alkoxy radical containing 3 to 8 carbon atoms and the siloxane polymer having a number average molecular weight of between about 1,000 and 1,600 and consisting predominantly of polymer chains containing at least about 4 monomer units; 0.1–3.0 weight percent of a bulk oxidation inhibitor; and 0.1–5.0 weight percent of a crystallization inhibitor having the formula:

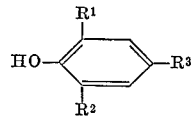

wherein $R^1$ is a secondary or tertiary alkyl group having 4 to 8 carbon atoms; $R^2$ and $R^3$ are each a hydrocarbon group or a group containing carbon, hydrogen, and oxygen, and together have a total of 22 to 40 carbon atoms and 0 to 5 oxygen atoms.

DETAILED DESCRIPTION OF THE INVENTION

In its broadest form, the composition of this invention is a fluid composition suitable for use as the power transmission medium in a hydraulic system and exhibiting good oxidative stability at temperatures in the range of 300°–400° F., and comprising 55 to 99.8 weight percent poly(alkoxy)siloxane, the alkoxy radical containing 3 to 8 carbon atoms and the siloxane polymer having a number average molecular weight of between 1,000 and 1,600 and consisting predominantly of polymer chains containing at least about 4 monomer units; 0.1–3.0 weight percent of a bulk oxidation inhibitor; and 0.1–5.0 weight percent of a crystallization inhibitor having the formula:

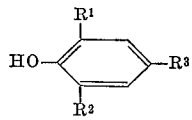

wherein $R^1$ is a secondary or a tertiary alkyl group having 4 to 8 carbon atoms; $R^2$ and $R^3$ are each a hydrocarbon group or a group containing carbon, hydrogen, and oxygen, and together have a total of 22 to 40 carbon atoms and 0 to 5 oxygen atoms. For convenience, the carbon-hydrogen-oxygen group will be referred to herein as an "oxyhydrocarbyl" group, except where a specific structure is described.

Poly(alkoxy)siloxane is the major component of the fluid composition of this invention, and comprises about 55 to 99.8 weight percent of the total fluid. The alkoxy radical contains 3 to 8 carbon atoms and may be branched- or straight-chain. Typical alkoxy radicals are n-butoxy, isopentoxy, 2-ethylbutoxy, 2-ethylhexoxy, or 2,2-dimethylbutoxy. The siloxane polymer has a number average molecular weight of between about 1,000 and 1,600 and consists predominantly of a mixture of polymer chains containing at least 4 monomer units. A typical example is a poly(isopentoxy)siloxane having a number average molecular weight of about 1,300.

The crystallization inhibitor is chosen from the class of 2-alkyl-4,6-($C_{25}$–$C_{40}$ hydrocarbon- or oxyhydrocarbyl-substituted) phenols. These have the following structure:

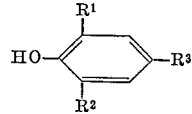

$R^1$ is a secondary or a tertiary alkyl group having 4 to 8 carbon atoms; preferably a tertiary alkyl group, and more preferably the tertiary butyl group. Other groups possibly include, but are not limited to, the isopropyl group, secondary butyl group, and secondary and tertiary amyl, hexyl, heptyl, and octyl groups.

$R^2$ and $R^3$ are each hydrocarbon or oxyhydrocarbyl groups and together have a total of 22 to 40 carbon atoms and 0 to 5 oxygen atoms. Preferably, they contain a total of 25 to 35 carbon atoms and 0 to 3 oxygen atoms.

$R^2$ may be either a hydrocarbon or oxyhydrocarbyl group. While it may contain any of the structures described below for $R^3$, it is preferred that it be a lower alkyl group having 1 to 8 carbon atoms and, more preferably, a secondary or tertiary lower alkyl group having 3 to 8 carbon atoms. Particularly preferred is the tertiary butyl group.

$R^3$ contains the remaining carbon and oxygen atoms of the $R^2$-$R^3$ combination. These may be in a variety of configurations including, but not limited to, the following structures: alkyl, aryl, alkaryl, ester, ether, hydroxy, carboxy, and combinations of these. The overall $R^3$ configuration may be aliphatic straight- or branched-chain, cycloaliphatic, or aromatic. The $R^3$ configuration may not be of a type that will react with and have a detrimental effect (such as discoloration) on the siloxane fluid. Specifically excluded from possible $R^3$ structures by this requirement is the peroxide structure. Elements other than C, H, or O are also specifically excluded.

The crystallization inhibitor should be present in the hydraulic fluid in amounts of approximately 0.1–5.0 weight percent and, more preferably, 0.5–3.0 weight percent of the total fluid.

The fluid must also contain 0.1–3.0 weight percent of a bulk oxidation inhibitor. Several of these are described in the art. A typical, and widely used, inhibitor is di-t-butyl-p-cresol.

Small amounts of other materials may also present in the hydraulic fluid. For instance, where it is desirable or necessary to enhance the lubricating characteristics of the siloxane, or to provide greater fluidity where extremes of temperature are encountered, a lubricant may be added. Suitable lubricants include animal, vegetable, and mineral oils, and derivatives of such oils. These lubricants must not, themselves, be extraordinarily susceptible to oxidation. Further, they must be completely miscible with the siloxane and whatever other additives may be present.

Other fluids which may be present include diluents, such as alcohols having at least about four carbon atoms, and rubber swelling agents. These latter are often required, for siloxane fluids cause shrinking in certain types of rubbers used as seals in hydraulic systems. The rubber swelling agents counteract this effect of the siloxane. Among the most commonly used act this effect of the siloxane. Among the most commonly used rubber swelling agents are the dibasic acid esters, such as di(2-ethylhexyl)sebacate, azelate, and adipate, and the trialkyl, triaryl, or mixed alkyl-aryl phosphates, such as tributyl phosphate or diphenyl(2-ethylhexyl)phosphate.

The various additive fluids mentioned in the preceding paragraphs should not exceed, in total, 30 weight percent of the entire fluid composition. Preferably, they are present as about 15 weight percent of the total fluid.

It may also be advantageous to incorporate into the fluid a viscosity index improver, such as the polymers of free radical addition polymerizable olefins. Preferred are the polymerized esters of the acrylic acid series, particularly the polymerized methacrylic acid esters. The latter are readily available commercially. The esters to be used should have number average molecular weights of from about 5,000 to about 35,000, and preferably from 5,000 to 15,000. These viscosity index improvers may be present as up to 15 weight percent of the total fluid, but preferably comprise only 2 to 10 weight percent and, more preferably, 5 to 10 weight percent.

Effectiveness of the crystallization inhibitors of this invention is illustrated in Table II below. In each experiment the additive to be tested (described in Table I) was put into a base fluid which consisted of 84 weight percent of poly(2-ethylbutoxy)siloxaned and 15 weight percent of di(2-ethylhexyl)sebacate. The additive was present as an additional one weight percent in the fluid during the test. The fluid was then heated as a thin film in the presence of air at 392° F. Visual examination of the fluid was made at the stated intervals.

TABLE I

| Additive | Compound | $R^2$ C | $R^2$ O | $R^3$ C | $R^3$ O | $R^3$ N | $R^3$ S | $R^2+R^3$ C | $R^2+R^3$ O |
|---|---|---|---|---|---|---|---|---|---|
| A | di-t-Butyl-p-cresol | 4 | 0 | 1 | 0 | 0 | 0 | 5 | 0 |
| B | bis (3,5-di-t-butyl-4-hydroxyphenyl) mehtane | 4 | 0 | 15 | 1 | 0 | 0 | 19 | 1 |
| C | Octadecyl 3-(3',5'-di-t-butyl-4'-hydroxyphenyl) propionate | 4 | 0 | 21 | 2 | 0 | 0 | 25 | 2 |
| D | 2,4-di-(3',5'-di-t-butyl-4'-hydroxyphenoxy)-6-octylthio-1,3,5-triazine | 4 | 0 | 25 | 3 | 3 | 1 | 29 | 3 |

TABLE II

| Additive | Fluid appearance after— | | | | |
|---|---|---|---|---|---|
| | 1 hr. | 4 hrs. | 7 hrs. | 16 hrs. | 23 hrs. |
| None | Clear liquid | Opaque and crystalline | | | |
| A | do | do | | | |
| B | Liquid | Slight crystallization | Complete crystallization | | |
| C (Exp. 1) | Clear liquid | Clear liquid | Clear liquid | Liquid | Light yellow liquid; slight crystallization. |
| C (Exp. 2) | do | do | do | Clear liquid | Clear liquid. |
| D | do | Yellow liquid | Dark yellow liquid | | Brown liquid |

It is apparent from these data that those compounds which contain less than 22 total carbon atoms in the $R^2$ and $R^3$ groups have little effect on the crystallization of the base fluid. These compounds extend the life of the fluid by no more than a factor of two. The compounds of this invention, however, extend the fluid life by a factor six or more.

It is also apparent from these data that restriction of the $R^2$ and $R^3$ constituents to those containing only C, H, and O is also important, for, as illustrated by Additive D, if other elements are present, the fluid will quickly become badly discolored, even though crystallization may be inhibited.

The difference between the crystallization inhibitors claimed in the composition of this invention and phenol group-containing bulk oxidation inhibiting compounds is illustrated by the following comparison. Three samples using a siloxane base fluid containing 84 parts by weight of poly(2-ethylbutoxy)siloxane and 15 parts by weight of di(2-ethylhexyl)sebacate were subjected to an Oxidator A Test. This test determines the oxidation stability of a given sample by the measurement of the time required for the uptake of 1 liter of oxygen per 100 g. of sample at 340° F. in a closed container. Each sample contained 25 g. of base fluid in bulk form; there was no thin-film oxidation. Sample 1 contained the fluid plus 1 weight percent of Additive C. Sample 2 contained base fluid +Additive A in an amount equimolar to the amount of Additive C in Sample 1. Sample 3 consisted of the base fluid+1 weight percent Additive C+1 weight percent of Additive A. The "Oxidator A stability" of Sample 1 was 4.6 hours; of Sample 2 was 7.4 hours; and of Sample 3 was 8.1 hours. From these data, it is apparent that the crystallization inhibitors claimed as part of this invention are not the equivalent of the commonly known bulk oxidation inhibitors, such as Additive A. It is also apparent that crystallization inhibitors do not significantly affect the oxidation inhibiting effect of the bulk oxidation inhibitors.

From the above discussion and data, it is evident that the composition claimed in this invention is a highly useful siloxane fluid having excellent thermal stability properties under not only bulk oxidation conditions, but also thin-film crystallization conditions at high temperatures. This property makes the fluid of this invention particularly suitable for use in the hydraulic systems of the new generation of supersonic transport aircraft.

We claim:
1. A composition consisting essentially of
(A) 55 to 99.8 weight percent of poly(alkoxy)siloxane, wherein the alkoxy radical contains from 3 to 8 carbon atoms and the siloxane polymer has a number average molecular weight of between about 1,000 and 1,600 and consists predominantly of polymer chains containing at least about 4 monomer units;
(B) 0.1 to 3.0 weight percent of di-t-butyl-p-cresol as a bulk oxidation inhibitor; and
(C) 0.1 to 5.0 weight percent of a crystallization inhibitor having the formula

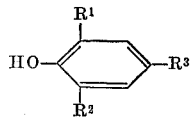

wherein $R^1$ is a secondary or tertiary alkyl group of from 4 to 8 carbon atoms, $R^2$ is a lower alkyl group of from 1 to 8 carbon atoms, and $R^3$ is an alkyl or aryl hydrocarbon group, $R^2$ and $R^3$ together having a total of 22 to 40 carbon atoms.

2. The composition described in claim 1, wherein $R^1$ and $R^2$ are each tertiary alkyl groups.

3. The composition described in claim 2, wherein each tertiary alkyl group is the tertiary butyl group.

4. The composition described in claim 1 further characterized by also containing 0.1 to 20.0 weight percent of di(2-ethylhexyl)sebacate as a rubber swelling agent.

5. A composition consisting essentially of
(A) 55 to 99.8 weight percent of poly(alkoxy)siloxane, wherein the alkoxy radical contains from 3 to 8 carbon atoms and the siloxane polymer has a number average molecular weight of between about 1,000 and 1,600 and consists predominantly of polymer chains containing at least about 4 monomer units;
(B) 0.1 to 3.0 weight percent of di-t-butyl-p-cresol as a bulk oxidation inhibitor; and
(C) 0.1 to 5.0 weight percent of a crystallization inhibitor having the formula

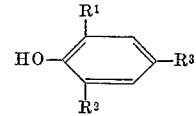

wherein $R^1$ is a secondary or tertiary alkyl group of from 4 to 8 carbon atoms, $R^2$ is a lower alkyl group of from 1 to 8 carbon atoms, and $R^3$ is a monovalent ester group consisting only of carbon, hydrogen, and oxygen atoms and containing not more than 5 oxygen atoms, at least two of which are present with a carbon atom as a carboxylate group $R^2$ and $R^3$ together having a total of 22 to 40 carbon atoms.

6. The composition described in claim 5 wherein $R^1$ and $R^2$ are each tertiary alkyl groups.

7. The composition described in claim 6 wherein each tertiary alkyl group is the tertiary butyl group.

8. The composition described in claim 7 wherein said crystallization inhibitor is octadecyl 3-(3',5'-di-t-butyl-4'-hydroxyphenyl)propionate.

9. The composition described in claim 5 further characterized by also containing 0.1 to 20.0 weight percent of di(2-ethylhexyl)sebacate as a rubber swelling agent.

References Cited
UNITED STATES PATENTS

| | | | |
|---|---|---|---|
| 3,098,826 | 7/1963 | McMordie et al. | 252—78 |
| 3,146,206 | 8/1964 | Furby et al. | 252—78 |
| 3,226,443 | 12/1965 | Meier et al. | 252—404 X |
| 3,346,648 | 10/1967 | Worrel | 252—404 X |
| 3,247,240 | 4/1966 | Meier et al. | 252—404 X |
| 3,211,652 | 10/1965 | Hinkamp | 252—49.8 |

LEON D. ROSDOL, Primary Examiner

H. A. PITLICK, Assistant Examiner

U.S. Cl. X.R.
252—404